United States Patent [19]

Hayamizu et al.

[11] 4,102,571
[45] Jul. 25, 1978

[54] METHOD FOR OPTICALLY MEASURING A DISTANCE

[75] Inventors: Mamoru Hayamizu; Yasushi Tanigaki, both of Tokyo, Japan

[73] Assignee: Kabushiki Kaisha Daini Seikosha, Japan

[21] Appl. No.: 734,429

[22] Filed: Oct. 21, 1976

[30] Foreign Application Priority Data

Oct. 31, 1975 [JP] Japan .............................. 50-131788

[51] Int. Cl.² ........................... G01C 3/00; G01C 3/08
[52] U.S. Cl. ....................................... 356/1; 250/560; 356/4
[58] Field of Search ................... 356/1, 4, 141, 152, 356/156, 159, 108; 250/560

[56] References Cited

U.S. PATENT DOCUMENTS

| | | | |
|---|---|---|---|
| 3,217,592 | 11/1965 | Braun et al. | 356/1 |
| 3,554,646 | 1/1971 | Carlson | 356/4 |
| 3,565,531 | 2/1971 | Kane et al. | 250/560 |
| 3,671,726 | 6/1972 | Kerr | 356/156 |
| 3,692,414 | 9/1972 | Hosterman et al. | 356/4 |
| 3,802,774 | 4/1974 | Eschler et al. | 356/1 |
| 3,856,399 | 12/1974 | Hosoe et al. | 356/1 |

*Primary Examiner*—S. C. Buczinski
*Attorney, Agent, or Firm*—Robert E. Burns; Emmanuel J. Lobato; Bruce L. Adams

[57] ABSTRACT

A beam of light from a light source is reflected by a polyhedron mirror which is continuously rotating around its axis. The reflected beam sweeps on an object and passes a predetermined point of the object surface. A dispersed light from the point is formed into a beam through a set of slits and reaches into a light detector.

The polyhedron mirror has a plurality of mirror surfaces each of which is spaced at an independent distance from the rotary axis thereof.

The distance between the predetermined point of the object and the beam line from the light source is computed by using the distances of the mirror surfaces from the rotary axis of the polyhedron mirror and the inclination angles of the mirror surfaces from the beam line, at which angles the reflected beam hits the predetermined point.

4 Claims, 3 Drawing Figures

METHOD FOR OPTICALLY MEASURING A DISTANCE

BACKGROUND OF THE INVENTION

This invention is concerned with a method for optically measuring a distance about three dimensional objects.

Conventional methods of this kind have very precise accuracy such as a method using light interference, a method using holography, a method using moire image interference fringes and others. But these methods are available for laboratory use, but not suitable for on-line use in a plant.

Optical measuring method of triangulation not possible or available for on-line use in these optical measuring methods. The method of the present invention is based on a triangular measuring method, with the theory, being described first by referring to FIG. 1.

A laser beam a is projected on a base line 1 toward a mirror 2 from which it is reflected as beam b which is irradiated on an object 3 making a spot P on the object. Spot P is detected by a photo-detector 4 by way of optical axis 7 nestled between a pair of slits 5 and 6. The distance M between spot P and base line 1 can be calculated if the distance $l$ between the intersecting point $Q_1$ of detecting optical axis 7 to base line 1 and the reflecting point $Q_2$ of laser beam a at mirror 2, are known also if the intersecting angle $\theta_1$ of detecting optical axis 7 to base line 1, and the intersecting angle $\theta_2$ of reflecting light line 6 to laser beam a, are known. In a practical method, mirror 2 is fixed so that angle $\theta_2$ has a constant value. By moving the combined photo-detector 4 and slits 5 and 6 parallel to base line 1, keeping angle $\theta_1$ constant, the distance $l$ will be determined. From the moving amount of movement of combined slits and photo-detector 4, until spot P is detected whereby the distance M is calculated. In another method, the combined photo-detector 4 and slits 5 and 6 are relatively fixed to keep angle $\theta_1$ constant, while the mirror 2 rotates to sweep the reflected light beam b on object 3. By this method, the distance M can be calculated using angle $\theta_1$, angle $\theta_2$ which is equal to $2\theta_3$, ($\theta_3$ is the rotating angle of mirror 2 referred to base line 1 when spot P is detected by photo-detector 4), and distance $l = d_2 - d_1 \sec \theta_3$, with $- d_3 \tan \theta_3$, $d_1$ indicating the distance between the rotating axis of mirror 2 and the mirror surface. $d_2$ indicates the distance between the rotating axis and intersecting point $Q_1$, and $d_3$ indicates the distance between the rotating axis and base line 1.

In this latter method, high accurate measurement of 2μm unit requires very stable values in distances $d_1$, $d_2$ and $d_3$ and in angle $\theta_1$ high precise measurement of the rotating angle $\theta_3$ of the mirror is also required. Distance $d_1$ is rather stable but $d_2$, $d_3$ and $\theta_1$ are strictly unstable due to thermal displacements. Particularly in measurement of the profile of the object by continuously moving the mirror and the photo-detector along the base line, it becomes extremely difficult to keep $d_3$ and $\theta_1$ constant. $\theta_1$ and $d_3$ should in fact be treated as variables. There is a similar problem in the former conventional method, in which distance $l$ and angle $\theta_1$ are also variables due to error in the photo-detector movement.

SUMMARY OF THE INVENTION

Therefore, it is the principal object of the present invention to provide a method for optically measuring a distance precisely thereby eliminating the above mentioned inaccuracy in the triangulation method.

The method according to this invention has characteristic features in which a rotating mirror having a plurality of mirror surfaces each of which has a different distance value of $d_1$ from other mirror surfaces is used, whereby the true distance M can be attained under no influence of the unstable or variable factors.

DETAILED DESCRIPTION OF THE INVENTION

Figure 1:
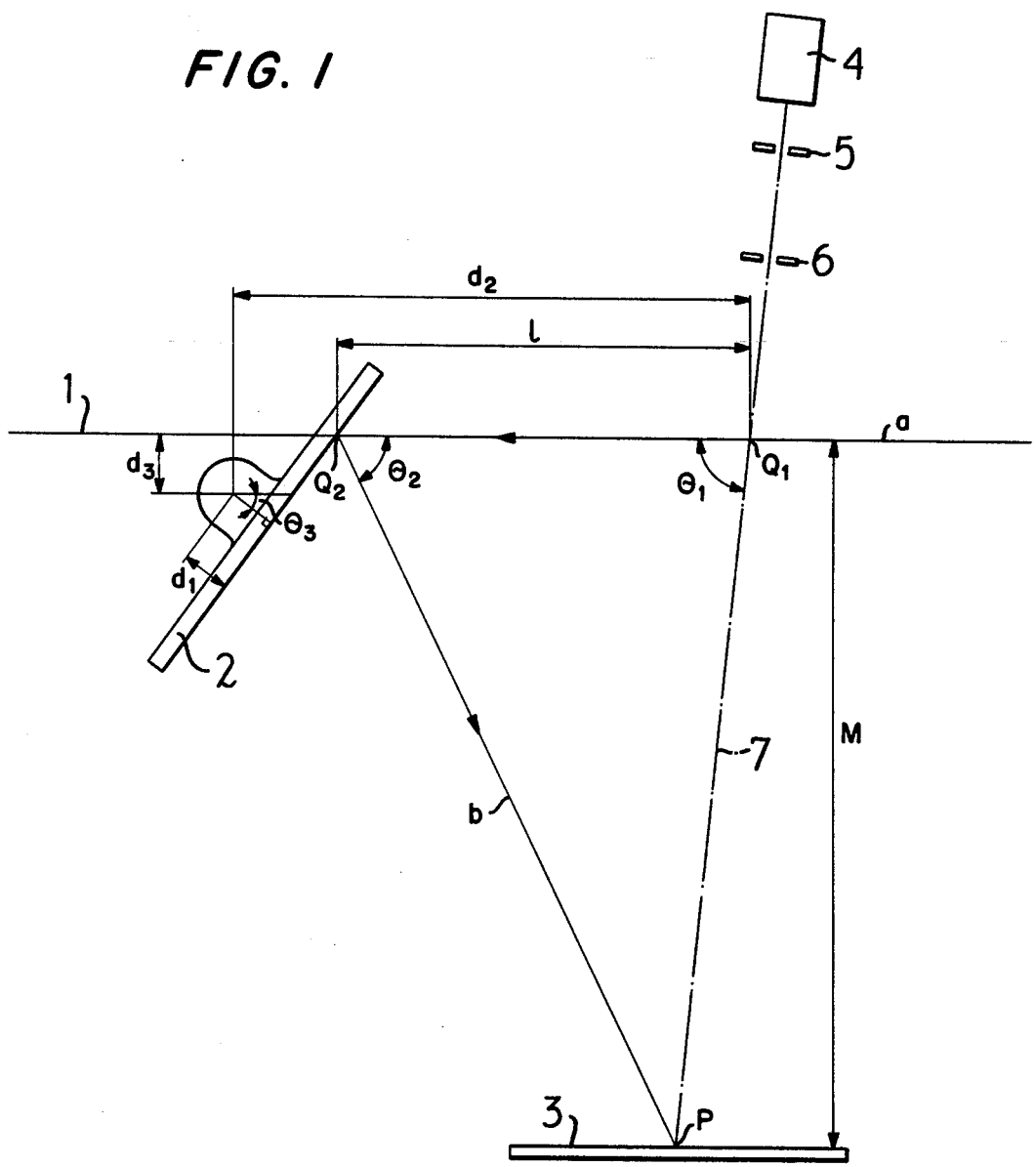
FIG. 1 is a schematic view showing a conventional triangular measurement theory for optically measuring a distance on an object.
Figure 2:
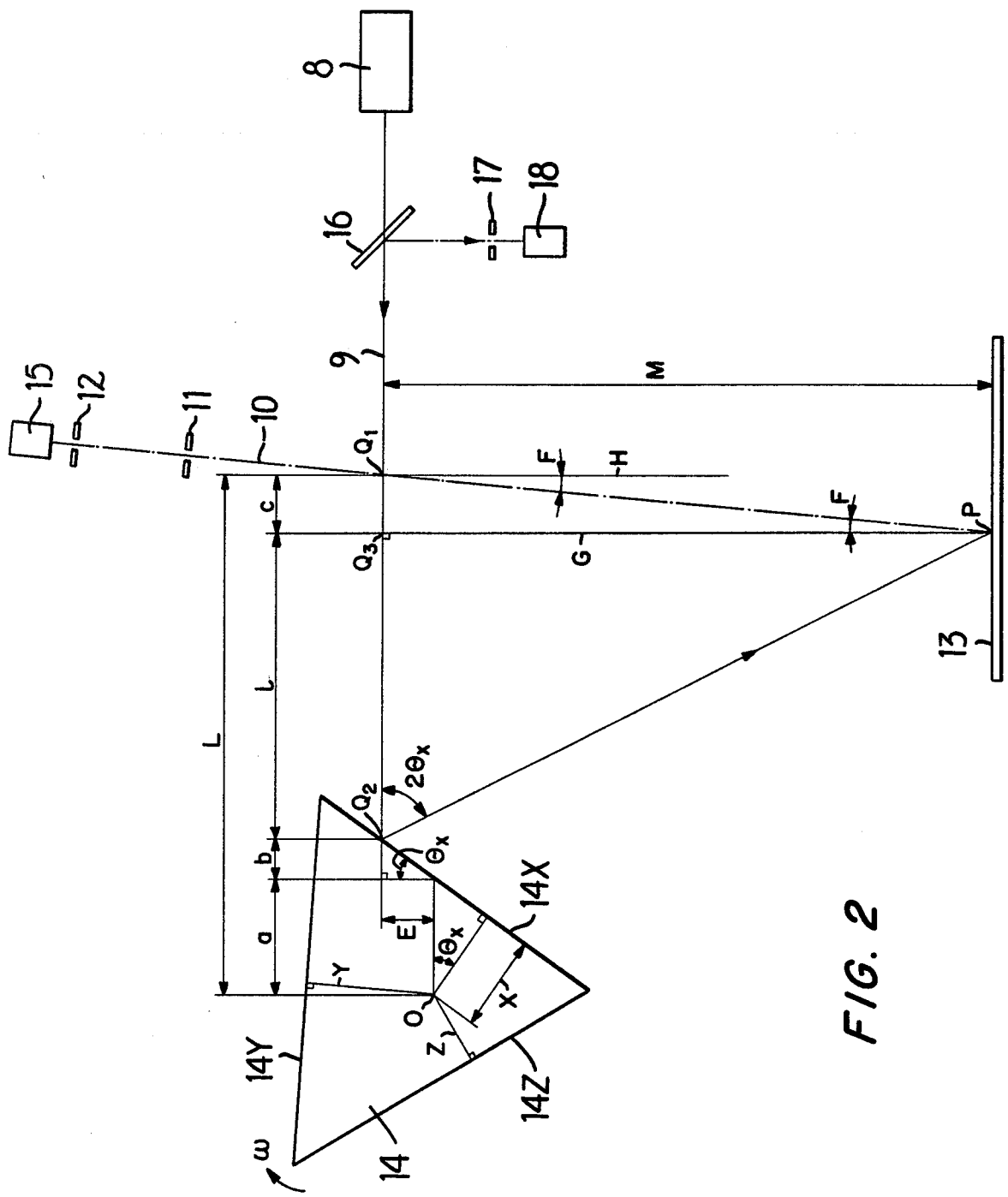
FIG. 2 is a schematic view showing an optical distance measurement theory according to this invention.

The method for optically measuring a distance according to this invention will now be described referring to FIG. 2, in which reference numeral 8 designates a laser tube. The laser beam axis from the laser tube 8 is used as the base line or reference axis 9 for measuring the distance. Reference numeral 10 designates a detecting optical axis determined by a set of slits 11 and 12 which are arranged perpendicular to base line 9. Reference numeral 13 is an object arranged to be measured parallel to base line 9.

Reference numeral 14 designates a rotating mirror intersecting base line 9, said rotating mirror being provided with three mirror surfaces 14X, 14Y and 14Z which have respectively distances X, Y and Z from the rotary axis O thereof. The distances X, Y and Z are different from each other. Rotating mirror 14 is driven by a motor which is not shown in the drawing. Accordingly, the laser beam from laser tube 8 is reflected by mirror surfaces 14X, 14Y and 14Z to sweep the surface of object 13 three times for every one rotation of the mirror 14. When the sweeping laser beam spot on object 13 reaches a crossing point P at which the laser beam crosses the detecting optical axis 10, reflected light from spot P is detected along the detecting optical axis by a photo-detector 15. Reference numeral 16 designates a half-mirror spaced in front of laser tube 8. Reference numeral 17 is a slit and numeral 18 is a photo-detector which detects the reflected light from mirror surface 14X, 14Y or 14Z through half-mirror 16 and slit 17 when mirror surface 14X, 14Y or 14Z takes the angular position perpendicular to the laser beam during the mirror rotation.

As described above, in one rotation of mirror 14, photo-detectors 15 and 18 respectively detect spot P once for each mirror surface 14X, 14Y or 14Z. It is to be understood that the time difference $t$ of the detecting times of detectors 18 and 15 means the rotation time of mirror 14 from when a mirror surface is perpendicular to the laser beam till when the reflected beam reaches at spot P such is as shown in FIG. 2. Therefore, when the laser beam is received by mirror surface 14X and, the angular velocity of mirror 14 is ω, and the time difference of the detecting times of detectors 18 and 15 is $t$, the rotation angle $\theta_{x1}$ of mirror 14 can be calculated as $\theta_{x1} = \omega t$. Therefore, both the angles of incidence and reflection of the laser beam to mirror surface 14X become equal to $\theta_{x1}$ when photo-detector 15 detects the spot P. It is further understood that the angle of ($<Q_1Q_2P$) is equal to $2\theta_{x1}$.

Let the distance between the rotary axis O of mirror 14 and base line 9 be E. Let the distance between reflecting point $Q_2$ and the crossing point $Q_3$ of base line 9 with line G re $l$. Line G intercepts point P and is vertical to base line 9. Let the angular error of perpendicular detecting optical axis 10 as with line G be F, and the distance between the rotary axis O and line H, which is crossing point $Q_1$ and is just vertical to base line 9, be L, the following formula applies, $$l = -a - b + L - c = -X \sec \theta_{x1} + L - M \tan F$$

Therefore, $$M = l \tan 2\theta_{x1} = (-X \sec \theta_{x1} - E \tan \theta_{x1} + L - M \tan F) \tan 2\theta_{x1}$$

considering that E and F are variables, this expression can be rearranged as, $$[M] \cot 2\theta_{x1} + [E] \tan \theta_{x1} - [L - M \tan F] = -X \sec \theta_{x1}$$

In the same manner, the following expressions are attained for mirror surfaces 14Y and 14Z.

$$[M] \cot 2\theta_{Y1} + [E] \tan \theta_{Y1} - [L - M \tan F] = -Y \sec \theta_{Y1}$$

$$[M] \cot 2\theta_{Z1} + [E] \tan \theta_{Z1} - [L - M \tan F] = -Z \sec \theta_{Z1}$$

Accordingly, these simultaneous equations can be solved using Cramer's Formula.

$$[D] = - \begin{vmatrix} \cot 2\theta_{X1} & \tan \theta_{X1} & 1 \\ \cot 2\theta_{Y1} & \tan \theta_{Y1} & 1 \\ \cot 2\theta_{Z1} & \tan \theta_{Z1} & 1 \end{vmatrix}$$

$$[M] = \frac{1}{[D]} = \begin{vmatrix} X \sec \theta_{X1} & \tan \theta_{X1} & 1 \\ Y \sec \theta_{Y1} & \tan \theta_{Y1} & 1 \\ Z \sec \theta_{Z1} & \tan \theta_{Z1} & 1 \end{vmatrix}$$

It can thus be recognized from this solution that the distance M has no connection with variables E, F and L and can be calculated only with the distances X, Y and Z between the mirror surfaces and the rotary axis O and the rotary angles $\theta_X$, $\theta_Y$ and $\theta_Z$.

The distance M is attained in every one rotation of the mirror 14, and, accordingly, it may be possible to successively measure the distance M from one end to the other end of the object in a similar manner, with continuous rotation of mirror 14 and continuous movement of object 13 along base line 9. Further for detecting rotary angles $\theta_{X2}$, $\theta_{Y2}$, $\theta_{Z2}$, $\theta_{X3}$ ... $M_2$ is calculated using $\theta_{Y1}$, $\theta_{Z1}$ and $\theta_{X2}$; $M_3$ is also calculated using $\theta_{Z1}$, $\theta_{X2}$ and $\theta_{Y2}$, and $M_4$, $M_5$ ... $M_n$ in the same way.

As described above, with the method for optically measuring a distance according to this invention, the geometry or shape of a three dimensional object is measured with high accuracy.

This method e.g. is available for the continuous measuring of strip thinness on line of a rolling process, which will be described and referred to in FIG. 3.

Figure 3:
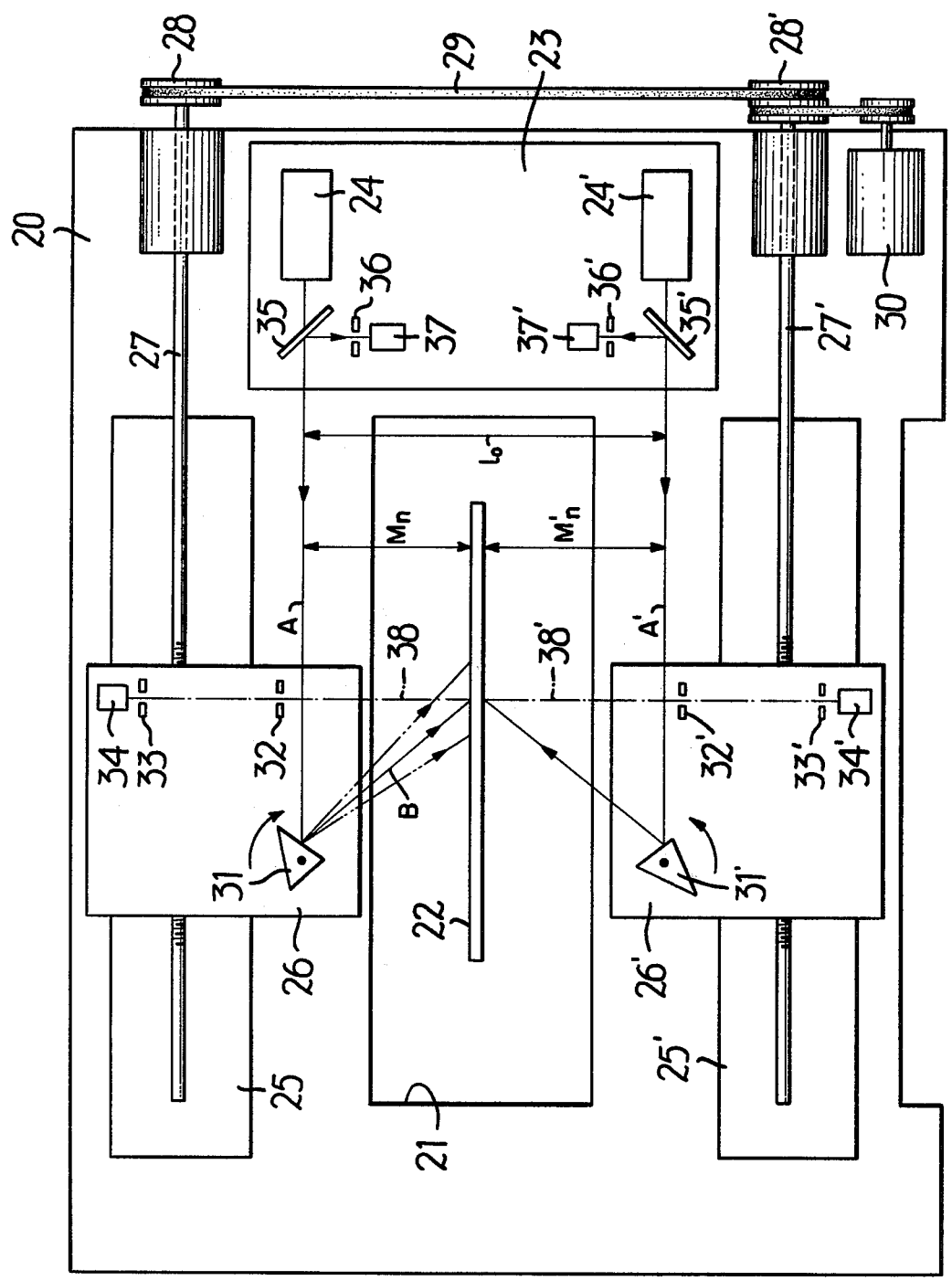
FIG. 3 is a schematic view showing a thickness measuring device applying the measuring method of this invention.

In FIG. 3, reference numeral 20 designates an O-shaped frame, through the center opening 21 of which runs an object or processed work 22 in the perpendicular direction to the drawing sheet. Reference numeral 23 designates a base mounted on O-shaped frame 20 and reference numerals 24 and 24' designate a pair of laser tubes respectively fixed on base 23 and arranged so that laser beams emanate therefrom on base or reference axes A and A' in the longitudinal direction of O-shaped frame 20. Reference numerals 25 and 25' designate a pair of guides for slidably guiding measuring heads 26 and 26', said guides being fixed on frame 20 parallel to each other in the longitudinal direction of the frame. Reference numerals 27 and 27' are feeding shafts for synchronously feeding measuring heads 26 and 26' with the aid of timing pulleys 28 and 28' which are respectively fixed on ends of shaft 27 and 27' and synchronously driven by a timing belt 29 which encircles and connects the pulleys 28 and 28'. A servo-motor 30 is provided to drive both the feeding shafts 27 and 27' through pulleys 28 and 28', whereby the pair of measuring heads 26 and 26' are synchronously fed in the longitudinal direction of frame 20, keeping their interspaced relation.

Reference numerals 31 and 31' designate rotary polyhedron-shaped mirrors respectively provided on measuring heads 26 and 26' to interrupt the laser beams from laser tubes 24 and 24'. Rotary mirrors 31 and 31' are rotated by driving motors (not shown) to sweep their reflected laser beam on the processed work 22. Reference numerals 32, 33, 32' and 33' are slits on measuring heads 26 and 26' through which photo-detectors 34 and 34', which are also fixed on the measuring heads 26 and 26', receive reflected spots of the laser beams from the processed work 22. Reference numerals 35 and 35' designate half-mirrors fixed on the base 23 in front of laser tubes 24 and 24'. Reference numerals 37 and 37' designate photo-detectors fixed on the base 23 to receive laser beams through slits 36 and 36' reflected by half-mirrors 35 and 35'.

The operation of the aforementioned thickness measuring device will be described hereinafter.

After setting the detecting optical axes 38 and 38', which are determined by slits 32, 33, 32' and 33', at one side (e.g. the right) of the processed work 22, measuring heads 26 and 26' are synchronously moved to the other side (to the left) while mirrors 31 and 31' are rotating so as to sweep reflected laser beams on both the surfaces of the processed work 22. Thus, distances $M_n$ and $M_n'$, which continuously fluctuate, are sampled and calculated according to the measuring principle of this invention, and the thickness of the processed work 22 is attained by subtracting ($M_n + M_n'$) from the distance $l_o$ between the base axes A and A'.

It is to be noted that, as laser beams A and A' are not shifted in direction there is no effect on measuring head movement. The true thickness can be measured even if distances between some members are fluctuated or shifted because of deviation or inclination of moving measuring heads 26 and 26'.

As described hereinbefore, in the method for optically measuring a distance according to this invention, a light beam stable in direction is always irradiated against a rotary mirror which has a plurality of mirror surfaces each of which is spaced at an independent distance from the rotary axis of the mirror and which is continuously rotating at a constant speed, said light beam being reflected by each of the mirror surfaces to sweep the surface of an object. A dispersed light from a spot, which is formed with the reflected light on the predetermined point of the object, is detected by a photo-detector, and the rotary angle of each mirror surface is also detected for calculating the distance between the stable light beam and the spot on the object with the rotary angles, and with the distances of the mirror surfaces from the rotary axis of the mirror. Therefore, even if there are some deviations or shifts in the relative distances of the mirror, the photo-detector or other members to the stable light beam, these variables do not effect the measuring of the distance of the spot to the stable light beam axis. The distances of the mirror surfaces from the rotary axis of the mirror and their rotary angles can be measured with high accuracy, so that the distance of the spot on the object to the stable light beam axis (base line) can be determined with high accuracy.

What is claimed is:

1. A method for optically measuring the distance from a reference axis to an object comprising: providing a rotatable polyhedron mirror having a rotary axis about which the mirror rotates and having a plurality of mirror surfaces disposed different distances from said rotary axis; continuously rotating said polyhedron mirror at a constant speed; irradiating a light beam along a predetermined reference axis toward said polyhedron mirror so that each of the rotating mirror surfaces successively reflects the light beam and sweeps the reflected light beam in a line over the object to develop a train of reflected light pulses; and successively detecting by a photo-detector the reflected light pulses reflected from a predetermined spot along the swept line and determining the rotary angles of said mirror at the instant of the reflected light detection by said photo-detector, whereby the distance between said spot and said predetermined reference axis can be calculated with the rotary angles of said mirror and with the distances of said mirror surfaces from said rotary axis of the polyhedron mirror.

2. A method for optically measuring a distance as claimed in claim 1, further including detecting by a second photo-detector a reflected light beam reflected from said mirror back along said predetermined axis for determining the base angle of said mirror.

3. A method for optically measuring the thickness of an object located a predetermined distance between a pair of parallel reference axes comprising: providing a pair of rotatable polyhedron mirrors each having a rotary axis about which the mirror rotates and each having a plurality of mirror surfaces disposed different distances from its rotary axis; continuously rotating said polyhedron mirrors at a synchronized constant speed around their respective axes; irradiating a pair of light beams along predetermined parallel reference axes respectively toward said polyhedron mirrors so that each of the rotating mirror surfaces successively reflects the light beams and sweeps the reflected light beams in a line over opposite sides of the object to develop corresponding trains of reflected light pulses; and successively detecting by a pair of photo-detectors the reflected light pulses reflected from a predetermined spot along the swept line on each side of the object and determining the rotary angles of each of said mirrors at the instant of the reflected light detection by said photo-detectors, whereby the thickness of the object at the location of said spots can be calculated with the rotary angles of said mirrors and with the distances of said mirror surfaces from the rotary axis of each of the polyhedron mirrors.

4. Method for optically measuring a thickness of an object as claimed in claim 3, further including detecting by a second pair of photo-detectors reflected light beams reflected from said mirrors back along said predetermined axes for determining the base angles of said mirrors.

* * * * *